Feb. 1, 1944. G. L. WARD 2,340,829
ELECTRIC SOLDERING IRON
Filed Dec. 24, 1941
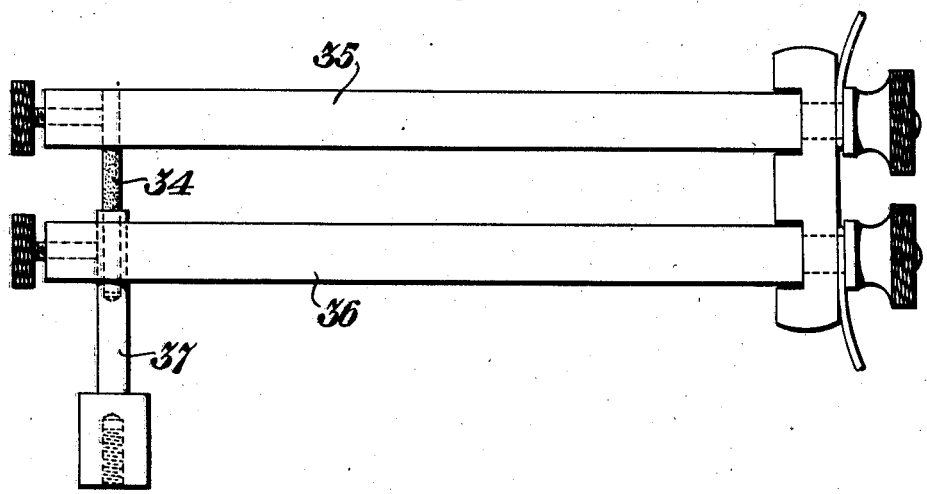
INVENTOR.
GEORGE L. WARD Patented Feb. 1, 1944

2,340,829

UNITED STATES PATENT OFFICE 2,340,829

ELECTRIC SOLDERING IRON

George Louie Ward, Northwood, England, assignor to International Standard Electric Corporation, New York, N. Y.

Application December 24, 1941, Serial No. 424,232
In Great Britain January 24, 1941

1 Claim. (Cl. 219—26)

This invention relates to electric soldering irons.

According to this invention we provide an electric soldering iron in which a heating element consisting of a carbon rod fits closely into a member of good conducting material which constitutes the soldering bit or to which the soldering bit is attached.

A description of certain embodiments of the invention will be given in conjunction with the accompanying drawing in which:

Fig. 1 shows a tool member forming part of a soldering iron in accordance with the invention; whilst Figs. 2 and 3 show two different forms of soldering bit which may be used with the tool member shown in Fig. 1.

Referring to the drawing, Fig. 1 shows a tool member which may form part of the foot operated electric soldering apparatus described and claimed in Patent application Serial Number 424,231 or may form part of a hand operated soldering iron. This tool member comprises two metal electrodes 35, 36, insulated from one another and held together as a unit.

The electric supply mains are connected to the electrodes 35, 36 preferably through a step down transformer. A carbon heater 34 in the form of a short rod is held between the electrodes 35, 36 and fits closely into a holder 37 of good conducting material. The holder 37 may be formed as shown with an internally screw threaded recess into which the shank of a soldering tool bit may be screwed. Two different forms of tool bit are shown in Figs. 2 and 3 which are thought to be self explanatory.

If desired the holder 37 may be shaped to have a cylindrical hollow portion into which the carbon rod 34 fits tightly and at the other end to have the conventional shape of the bit of a hand operated soldering iron.

For use in a hand-operated soldering iron the right hand end as seen in Fig. 1 of the electrodes 35 and 36 may be fixed into a handle of any convenient shape.

It is to be understood that the electrodes 35 and 36 may be shaped in any manner thought convenient. For example, in order to provide a straight soldering iron with a handle at one end and a bit at the other, one of the electrodes may be longer than the other and be bent over so as to carry the carbon rod 34 between the bent over end of one electrode and the end of the other.

What is claimed is:

An electric soldering iron comprising a pair of electrodes positioned in spaced parallel relation, an insulating support uniting the electrodes at one end thereof, a metal bit holder adjustably secured to one of the electrodes in right angular relation thereto and at the end opposite to the insulating support and a heating element comprising a carbon rod secured between the other of the electrodes and the bit holder to be heated by current flowing from one electrode and through the bit holder to the other of said electrodes and a soldering bit detachably fitted to the bit holder to be heated by heat conducted from said rod.

GEORGE LOUIE WARD.